Figure 1:
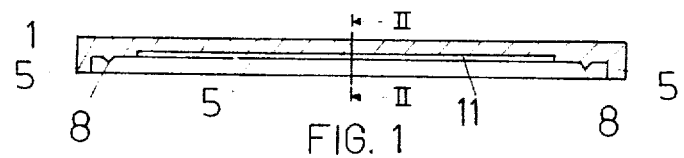

United States Patent [19]
Bergrahm et al.

[11] 3,875,045
[45] Apr. 1, 1975

[54] DEVICE FOR QUANTITATIVE AND QUALITATIVE DETERMINATION OF IONIZABLE COMPOUNDS

[75] Inventors: Bengt Göran Flemming Bergrahm, Helsinki; Anna Maija Teppo, Haukilahti, both of Finland

[73] Assignee: Orion-Yhtyma Oy, Helsinki, Finland

[22] Filed: Sept. 20, 1972

[21] Appl. No.: 291,094

[30] Foreign Application Priority Data
Sept. 24, 1971 Finland .............................. 2678/71

[52] U.S. Cl. ............................ 204/299, 204/180 G
[51] Int. Cl. ............................................. B01k 5/00
[58] Field of Search ...................... 204/180 G, 299

[56] References Cited
UNITED STATES PATENTS

| | | | |
|---|---|---|---|
| 3,371,027 | 2/1968 | LaPaglia et al. | 204/299 |
| 3,407,133 | 10/1968 | Oliva et al. | 204/299 |
| 3,482,943 | 12/1969 | Csizmas et al. | 204/299 X |
| 3,494,846 | 2/1970 | Arquembourg | 204/180 G |
| 3,635,808 | 1/1972 | Elevitch | 204/180 G |
| 3,674,678 | 7/1972 | Post, Jr. et al. | 204/299 |
| 3,715,295 | 2/1973 | Tocci | 204/180 GX |
| 3,803,020 | 4/1974 | Stephan | 204/299 |

*Primary Examiner*—John H. Mack
*Assistant Examiner*—A. C. Prescott
*Attorney, Agent, or Firm*—Richards and Geier

[57] ABSTRACT

A device for quantitative and qualitative determination of ionizable compounds, such as proteins, in particular of immunoglobulins. When quantitation of these compounds is concerned, a matrix containing antibodies to the substance in question is formed, which matrix most appropriately takes the form of a gel. The gel is subjected to electrophoresis, whereby the antibodies and corresponding antigens form a precipitation. The area or height of the precipitation formed constitutes a measure of the quantity of the substance examined. The invention is particularly characterized in that the device consists of a tightly closing and openable box having a cover portion and a dish portion, which latter has a plane bottom, on which the matrix is placed.

8 Claims, 5 Drawing Figures

DEVICE FOR QUANTITATIVE AND QUALITATIVE DETERMINATION OF IONIZABLE COMPOUNDS

The present invention concerns a device for quantitative and qualitative determination of ionizable compounds, such as proteins, in particular of immunoglobulins, in which determination, when their quantitation is concerned, antibodies to the substances one desires to quantify are placed to form a matrix, which most appropriately constitutes a gel and in which electrophoresis is carried out, and in which the antibody and corresponding antigen produce in the gel a precipitation, the area or height of the precipitation constituting a measure of the quantity of the substance under examination.

Immunological quantitative determination of substances having antigenic properties is a common routine procedure in numerous medical and science laboratories. When in particular the quantitative determination of immunoglobulins or of other serum proteins has been concerned, it has been common practice to employ the radial immunodiffusion technique (Immunochemistry, Pergamon Press 1965, Vol. 2, p. 235–254: G. Mancini, A. O. Garbonara, J. F. Heremans: "Immunochemical quantitation of antigens by single radial immunodiffusion"), in which in principle only a gel matrix containing antibody to the substance to be determined is needed.

In this so-called Mancini technique the antigen in question is deposited in a depression in the gel, and by measuring the diameter of the precipitation area which is formed around the depression, one may determine the content of the substance to be determined with an accuracy of about ± 10 percent.

Prior art also includes a determination method faster than the preceding one and which is based, instead on antigen diffusion, on employment of electrphoresis (Analytic Biochemistry 15, p. 45–52, 1966: C.-B. Laurell, "Quantitative estimation of proteins by electrophoresis in agarose gel containing antibodies"). By this so-called Laurell method one may rapidly and accurately perform antigen determinations by measuring the area or height of the precipitation formed in the gel on electrophoresis run. In the device according to the present invention mainly this previously known method is applied. A drawback associated with the use of the "Laurell method" has heretofore been that the preparation of the gel plates containing antibodies, which are used in the electrophoresis, being a phase carried out in research laboratories, has required a great amount of accurate manual work and personnel specialized in the preparation of such plates. When a device according to the invention is used, these preparatory operations can be dispensed with and determination of proteins can be performed as a routine operation. Another drawback in the use of the "Laurell method" has been the fact that human immunoglobulins cannot be as easily determined as other human serum proteins because human immunoglobulins, which act as antigens in the test, travel with equal or nearly equal velocity as the antihuman antibodies present in the gel. Endeavours have been made to eliminate this drawback by reducing the positive electric charge of the immunoglobulins by carbamylation (Scand J Lab Invest 22, p. 107–111, 1968: B. Weeks, "Quantitative estimation of human immunoglobulins following carbamylation by electrophoresis in antibody-containing agarose"). This method has the drawback that it requires a long time. In the reference mentioned, carbamylation for 18 hours at room temperature is recommended. In connection with the device according to the invention another method developed by ourselves may be used, by means of which the positive charge of the immunoglobulins can be sufficiently reduced so that they move towards the anode at pH 8.6. Of the aldehyde condensation method used by us, an example is presented in the following. One part by volume of cold, recently prepared 1.5 M formaldehyde solution (pH 8.6 is added to two parts by volume of the sample to be examined, and the mixture is left to stand 30 minutes at 0°C. The samples are pipetted (without delay) onto a Laurell plate or into a device according to our invention, and an electrophoresis run is carried out. This formaldehyde concentration has been found sufficiently to change the mobility of the immunoglobulins, and even then their specificity in the reaction with their antibodies is preserved.

The aim of the present invention is to avoid the drawbacks pointed out above, and to accomplish a device suitable for the use described in the foregoing which is simple to manufacture and easy to use in laboratory condition, and which device renders easily recordable results of measurement in the course of a normal workday.

The invention is mainly characterized in that the device consists of a tightly closing and openable box having a cover portion and a dish portion, the latter in its turn having a plane bottom on which the gel is placed.

Figure 2:
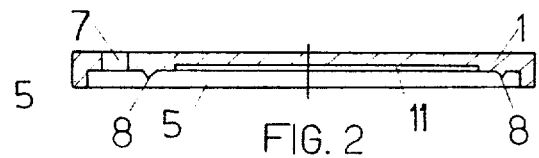
Figure 3:
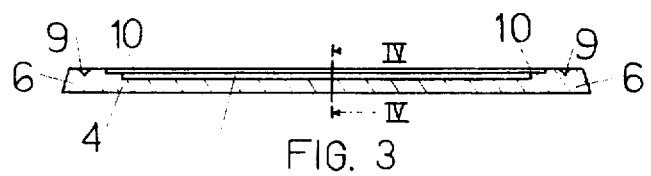
Figure 4:
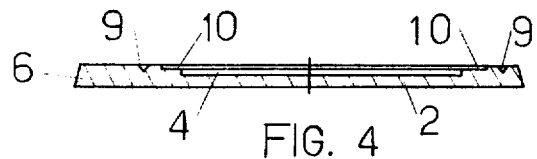
Figure 5:
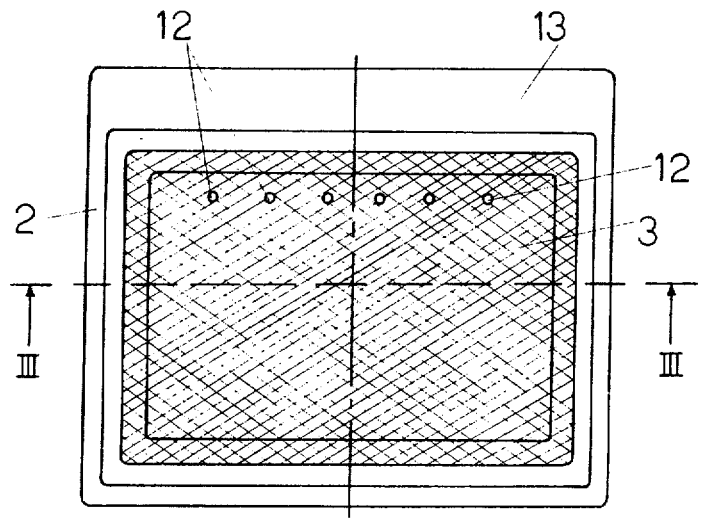

The invention is described in detail with reference to the embodiment shown in the figures of the attached drawing. In the drawing, FIG. 1 shows a sectional view of the cover portion of the device. FIG. 2 shows a section along line II—II in FIG. 1. FIG. 3, again, shows the dish portion of the device, and FIG. 3 is at the same time a section along line III—III in FIG. 5. FIG. 4 shows the section IV—IV in FIG. 3. FIG. 5 shows the dish portion, viewed from above.

The device according to the invention consists of an openable and tightly closing box, which has a cover portion 1 and a dish portion 2 for the matrix, most properly for gel 3. The box is closable so that the evaporation of water from the gel 3, which is e.g., agarose, is completely prevented. The entry of moisture from the exterior space into the gel 3 is equally prevented. This sealing has been accomplished by the aid of a sealing strip 8 encircling the cover portion 1 and which fits into a mating sealing groove 9 in the dish portion. The cover portion 1 is encircled by strips 5 which meet the outer rim 6 of the dish portion 2 so that the cover portion 1 can be pressed tightly upon the dish portion 2 when the box is closed. The matrix, which in the embodiment example is a gel 3, is also covered by a thin film (not depicted), which prevents the evaporation of moisture from the gel 3 and the condensation of moisture in the cover portion. In order to improve the sealing, there is a special substance, e.g., a wax-like substance, in the sealing groove.

In the dish portion 2 a depression 4 has been provided, which has a plane bottom, and into which the matrix, such as a gel 3, is poured to form a layer of uniform thickness. The margins of the depression 4 are encircled by a groove 10, which serves the purpose of promoting the contact of the bridge pieces with the gel 3 when the electrophoresis run is carried out. In the gel 3 which has been poured into the depression 4, in one of its marginal portions, a series of apertures 12 has been made, in which apertures in connection with quantitative determination the samples to be examined are placed. On the other margin of the dish portion 2 there is a space 13, intended e.g., for a label sticker. In the cover portion 1, on its side facing the dish portion, there is a depression 11 so that when the box is closed there remains an air gap between the cover portion 1 and the gel 3. Furthermore, the cover portion 1 has been provided with a hole or holes 7, by pushing through which e.g., with a pencil upon the dish portion, the box can be opened.

The box is made e.g., of transparent plastic material which is appropriate for the purpose. The cover portion and dish portion are most appropriately rectangular, and the box is so dimensioned that it is fit to be used in connection with the commonest electrophoresis apparatuses.

It is intended to market the device in closed and completely finished condition so that the matrix, such as the gel 3, has already been poured into the dish portion 2 and the gel 3 has already been provided with apertures 12 for the samples to be examined. When the device is taken into use, one opens the box and removes the thin film covering the matrix and places the dish portion 2 in the electrophoresis apparatus so that the fluid bridges contact both sides of the gel 3, whereby an electric field is produced in the gel. The samples to be examined are pipetted into the apertures 12 and the electrophoresis run is carried out as has been described above.

We claim:

1. Device for the quantitative and qualitative determination of ionizable compounds, such as proteins, particularly immunoglobulins, wherein antibodies to the substances to be determined being applied for the purpose of quantitative measurement to form a matrix, which most appropriately constitutes a gel, in which matrix the electrophoresis is carried out and wherein the antibody and the corresponding antigen produce a precipitation in the gel, the surface area or the height of the precipitate furnishing a measure of the quantity of the substance examined, and said device comprises a relatively thin, flat, tightly closable and openable box having a cover part and a dish part, said dish part being formed of a plate having a depression which has an even bottom, a matrix of uniform thickness, layer located in said depression, said layer having a height such that with the cover part placed upon the dish part and the box tightly closed so as to form an evaporation seal the matrix is not in direct contact with the inner surface of the cover part.

2. Device according to claim 1, wherein the cover part consists of a plate corresponding to the shape of the dish part, said plate having on its edges strips which lie against the edges of the dish part when the box is closed.

3. Device according to claim 1 characterized in that in the cover portion (1) a hole or holes (7) have been made by pushing against the dish portion (2) through which the box (1,2) can be opened.

4. Device according to claim 1, characterized in that the depression for the matrix in the dish portion (2) is encircled by another groove (10) for the matrix and that the side of the cover portion (1) facing the dish portion (2) has been provided with a depression (11) so that when the box (1,2) is closed an air gap remains between the matrix and the cover portion (1).

5. Device according to claim 1, characterized in that a mating sealing groove (9) with a sealing strip (8) therein is provided on the dish protion (2) along the line defined by the meeting of the cover portion (1) and said dish portion (2).

6. Device according to claim 1, characterized in that said matrix is a gel layer.

7. Device according to claim 2 characterized in that said matrix is a gel layer.

8. Device according to claim 4 characterized in that said matrix is a gel layer.

* * * * *